(12) United States Patent  
Panno, Jr.

(10) Patent No.: US 8,087,178 B2
(45) Date of Patent: Jan. 3, 2012

(54) ARTIST RELATIVE MEASURE DEVICE

(76) Inventor: Nicholas Joseph Panno, Jr., Stow, OH (US)

( * ) Notice: Subject to any disclaimer, the term of this patent is extended or adjusted under 35 U.S.C. 154(b) by 64 days.

(21) Appl. No.: 12/642,801

(22) Filed: Dec. 19, 2009

(65) Prior Publication Data

US 2011/0146096 A1 Jun. 23, 2011

(51) Int. Cl.
- B43L 13/16 (2006.01)
- B43L 13/02 (2006.01)
- B44D 3/00 (2006.01)

(52) U.S. Cl. ............... 33/483; 33/1 K; 33/277; 33/19.1; 33/41.1; 33/41.4

(58) Field of Classification Search ............ 33/1 K, 33/277, 483, 484, 485, 486, 494, 18.1, 18.2, 33/19.1, 19.2, 19.3, 41.1, 41.3, 41.4, 562, 33/566, 700; 7/164, 167; 15/DIG. 11; 81/489, 81/DIG. 5; 401/194, 195; 434/85, 90, 91
See application file for complete search history.

(56) References Cited

U.S. PATENT DOCUMENTS

| 494,921 | A | * | 4/1893 | Hayward | ........................... 7/105 |
| 1,428,582 | A | * | 9/1922 | Deitz | ............................... 33/664 |
| 2,388,252 | A | * | 11/1945 | Crane | ............................... 33/485 |
| 2,501,757 | A | * | 3/1950 | Cagle | ................................ 7/145 |
| 2,764,464 | A | * | 9/1956 | Morton et al. | ................ 346/112 |
| 2,773,443 | A | * | 12/1956 | Lambert | .................... 101/93.05 |
| 2,792,992 | A | * | 5/1957 | Ellison | ......................... 235/79.5 |
| 3,568,923 | A | * | 3/1971 | Chapman | .................... 235/70 D |
| 3,750,292 | A | * | 8/1973 | Dodge | ............................ 33/41.4 |
| 4,088,290 | A | | 5/1978 | Novello | |
| 4,202,105 | A | | 5/1980 | Hogle | |
| 4,497,117 | A | * | 2/1985 | Wrobley et al. | ................ 33/276 |
| 4,601,108 | A | * | 7/1986 | Swanson | ......................... 33/454 |
| 5,116,153 | A | * | 5/1992 | Tully | ................................ 401/35 |
| 5,134,747 | A | | 8/1992 | Roesler | |
| 5,345,636 | A | | 9/1994 | Lamons | |
| 5,781,950 | A | | 7/1998 | Swinden et al. | |
| 5,820,183 | A | * | 10/1998 | Marcus | ............................ 294/57 |
| 6,186,034 | B1 | | 2/2001 | Lamons | |
| 7,150,104 | B2 | * | 12/2006 | McKay et al. | ................. 33/21.1 |
| 7,389,589 | B2 | | 6/2008 | Debold | |
| 7,497,406 | B2 | | 3/2009 | Hudson | |
| 7,694,931 | B2 | | 4/2010 | Mantelli | |
| 2011/0146097 | A1 | * | 6/2011 | Panno, Jr. | ........................ 33/700 |

FOREIGN PATENT DOCUMENTS

| DE | 3627230 A1 * | 2/1988 |
| EP | 1457356 | 9/2004 |
| GB | 2323818 A * | 10/1998 |

\* cited by examiner

Primary Examiner — R. A. Smith

(57) ABSTRACT

This invention provides a series of evenly spaced marks disposed on an art implement handle which allow an artist to accurately compare the relative sizes of different portions of their subjects so that they may depict them to scale.

3 Claims, 5 Drawing Sheets

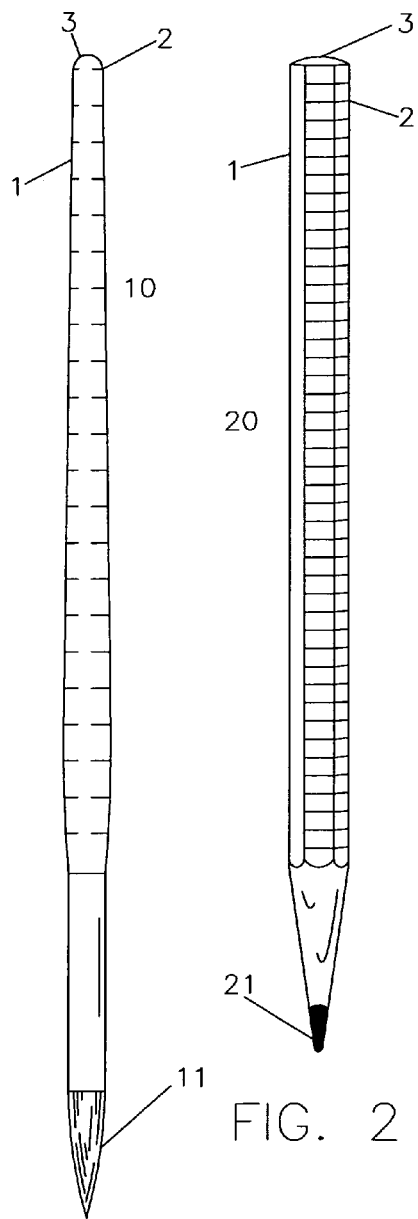
FIG. 1
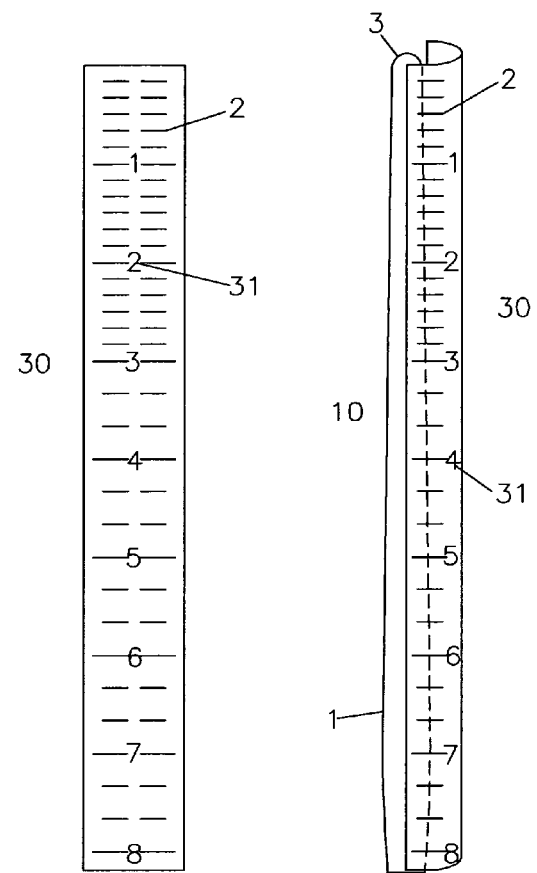
FIG. 2
FIG. 3a
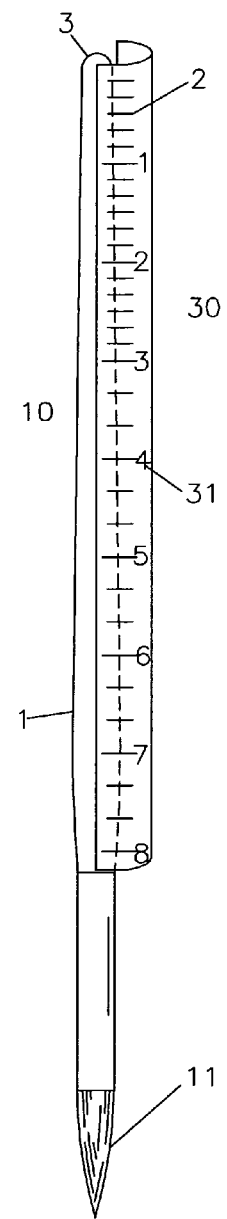
FIG. 3b

ARTIST RELATIVE MEASURE DEVICE

BACKGROUND OF THE INVENTION

Embodiments of this invention relate to art implements such as paintbrushes, pencils, other marking instruments, and chisels.

When artists create works of art based on observations of models or natural scenes, they are often interested in comparing the relative sizes of different portions of their subjects so that they might depict their subjects in proper proportion. One technique employed by many artists to gauge sizes is holding the handle of an art implement against their subject, observing the length of the subject relative to the handle, and translating the approximate length of the subject to their canvas, sculpture, or other medium by holding the handle against the medium.

This technique of measure is convenient, because it allows the artist to use the art implement they are already holding to measure scale, but it is also imprecise and requires repeated measurements since the measurement location on the art implement is lost after scaling. The artist "eyeballs" the relative length and only approximately translates this length to the work of art. Any slip of the finger or slight error in judgment can yield disproportion among various objects the artist is attempting to depict.

BRIEF DESCRIPTION OF DRAWINGS

FIG. 1 depicts a paintbrush with handle comprising an embodiment of the invention.

FIG. 2 depicts a pencil with handle comprising an embodiment of the invention.

FIG. 3a illustrates a transparent film of an embodiment, the film baring graduation lines and numbering.

FIG. 3b illustrates the transparent film of FIG. 3a juxtaposed with an art implement of an embodiment.

DETAILED DESCRIPTION OF INVENTION

Figure 4:
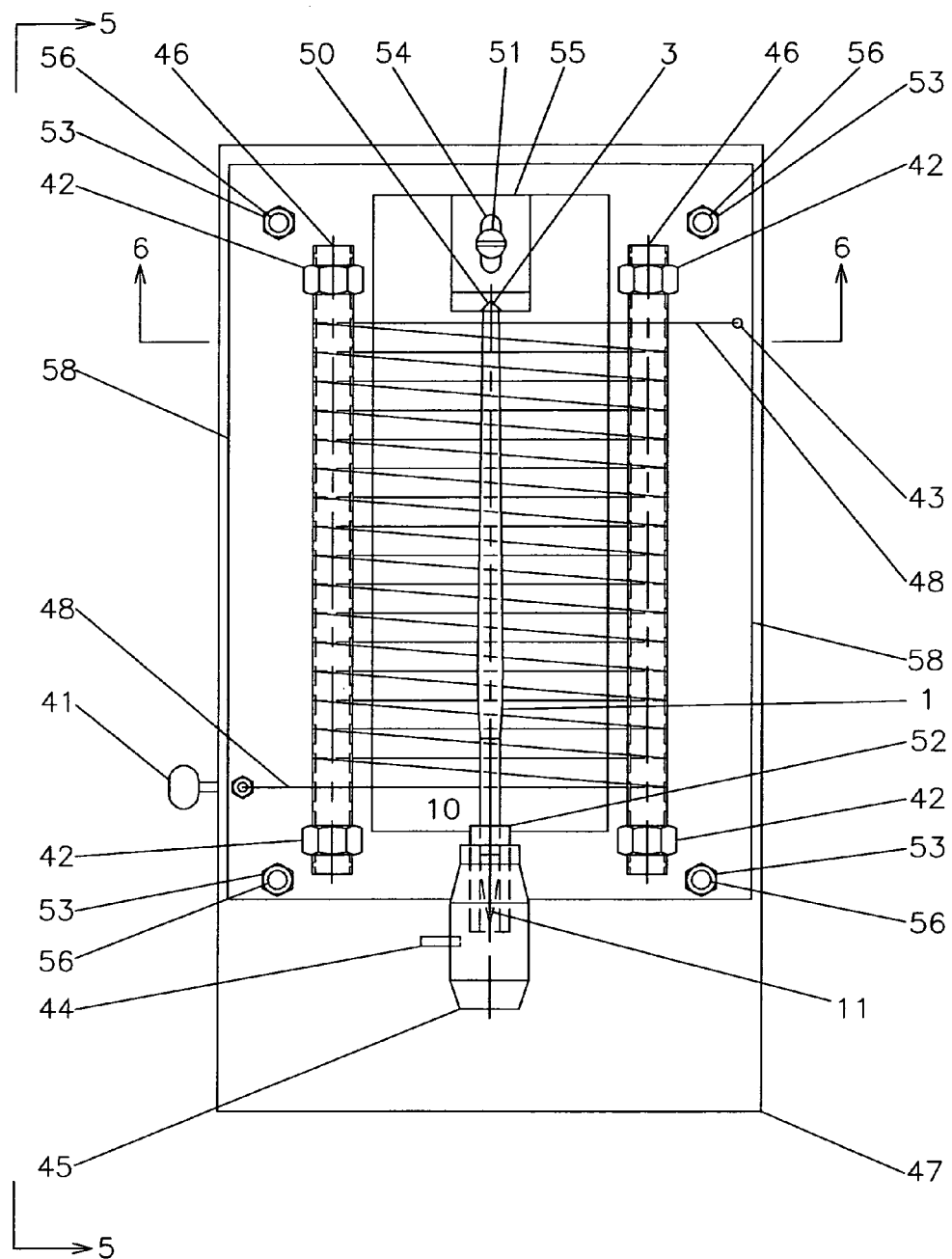
FIG. 4 depicts an overhead view of a handle marking device.

The following is a description of embodiments of the invention with reference to the drawings. It will be clear to those skilled in the art that other embodiments may be present, therefore this description is not intended to be exhaustive of the scope of the invention.

FIGS. 1 and 2 depict art implements according to an embodiment of the invention. FIG. 1 illustrates a paintbrush 10 with a brush head 11 and a handle 1. FIG. 2 illustrates a pencil 20 with a writing point 21 and a handle 1. In FIG. 1 and FIG. 2, the handle 1 may have a rear end 3 which is disposed opposite the brush head 11 and the writing point 21 respectively. Each handle 1 also may have a series of marks 2 disposed between the rear end 3 and the brush head 11 or the writing point 21 at regular intervals. It is noted that while FIG. 1 presents a paintbrush 10 and FIG. 2 presents a pencil 20, other art implements which have handles 1 may also be used in alternate embodiments of the invention. Examples of such art implements may include a maul, a chisel, a pencil lengthener, or other art implement. It is further noted that while FIGS. 3a, 3b, 7a, and 7b illustrate a paintbrush 10, the features of the invention depicted in FIGS. 3a, 3b, 7a, and 7b may be found in alternate embodiments of the invention using a pencil 20 or other art implements which have handles 1.

The marks 2 on the handle 1 may allow a user of an art implement to measure the length of a subject and translate that length to a medium such as a canvas or paper. In some embodiments of the invention, the marks 2 may also serve a secondary function by improving the grip of the handle 1 or providing an aesthetic appeal. In some embodiments of the invention, numbers 31 may be disposed adjacent to some or all of the marks 2, as depicted in FIG. 3a.

In an embodiment of the invention, the handle 1 may taper towards the rear end 3, as depicted in FIG. 1. In other embodiments, such as that depicted in FIG. 2, the handle may maintain a constant width along its entire length.

In an embodiment of the invention, the marks 2 may extend 270 degrees around the circumference of the handle 1 or some other distance less than the total circumference of the handle 1. This may allow a manufacturer of an art implement to display a trademark or other symbol without the marks 2 obscuring the design. Alternatively, the marks 2 may extend around the entire 360 degree circumference of the handle 1, or some of the marks 2 may extend the entire circumference of the handle 1 and other marks 2 may extend less than the circumference of the handle 1.

Figures 7A, 7B:
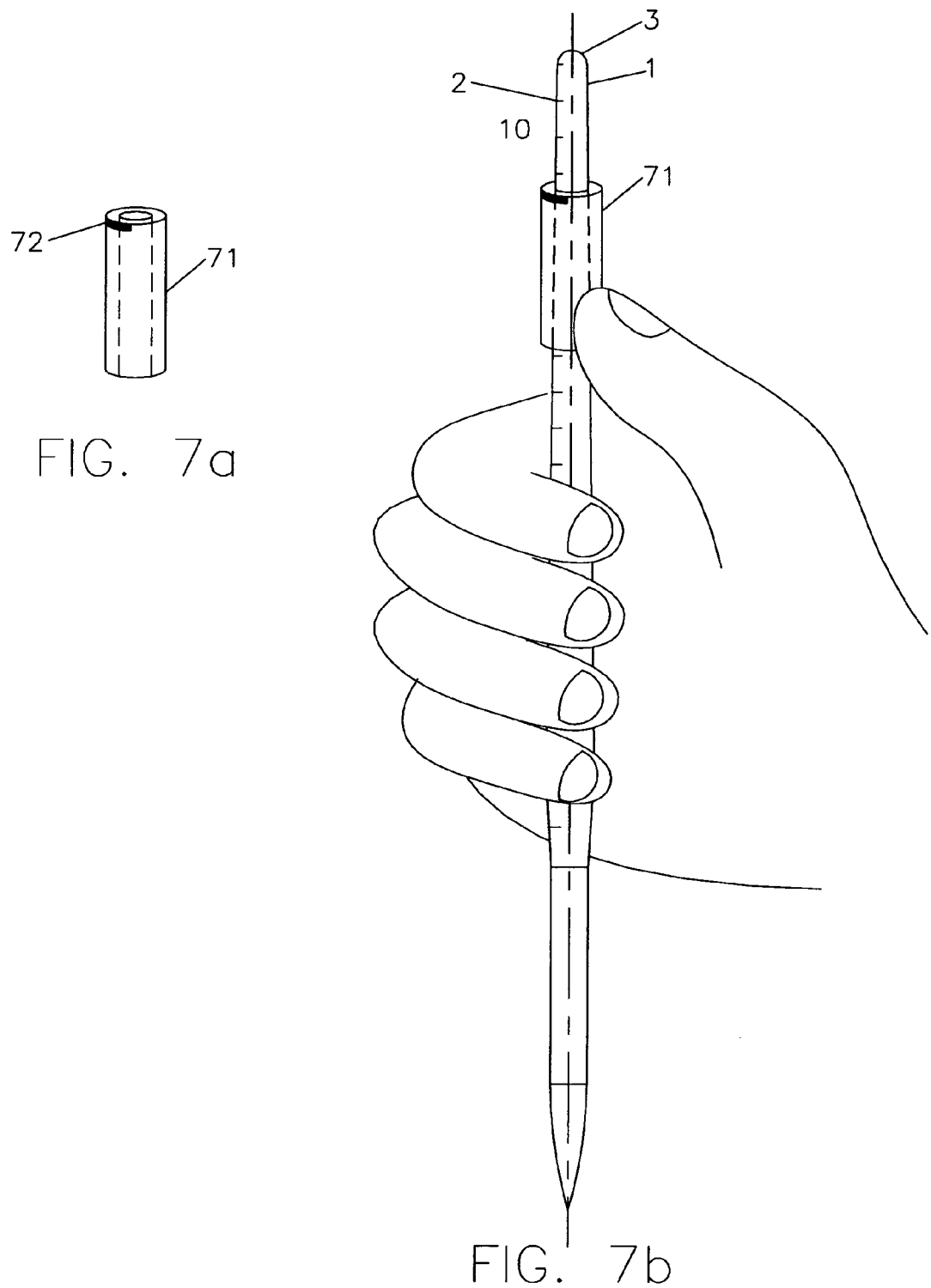
FIG. 7a illustrates a slide of an embodiment.
FIG. 7b illustrates the slide of FIG. 7a installed on an art implement of an embodiment.

In an embodiment of the invention depicted in FIG. 7b a slide 71 may be disposed on they handle 1. One or more contrast marks 72 may be disposed on the slide 71. The slide 71 may be adjustable by a user. The slide 71 may allow a user to more easily use the marks 2 to measure the length of a subject.

In an embodiment of the invention depicted in FIGS. 3a and 3b, the marks 2 may be deposited on the handle 1 by first being created on a transparent medium 30, which may be affixed to the handle 1 by adhesive means. In an alternative embodiment of the invention, the transparent medium 30 may be a heat-sensitive medium which may be placed around the handle 1 and may be affixed by applying heat to the transparent medium 30 to shrink it around the handle 1. In an alternative embodiment of the invention, the marks 2 may be drawn on the handle 1. In an alternative embodiment of the invention, the marks 2 may be etched on the handle 1. An embodiment of a handle marking device 40 which can etch the marks 2 onto the handle 1 is described below.

Figure 5:
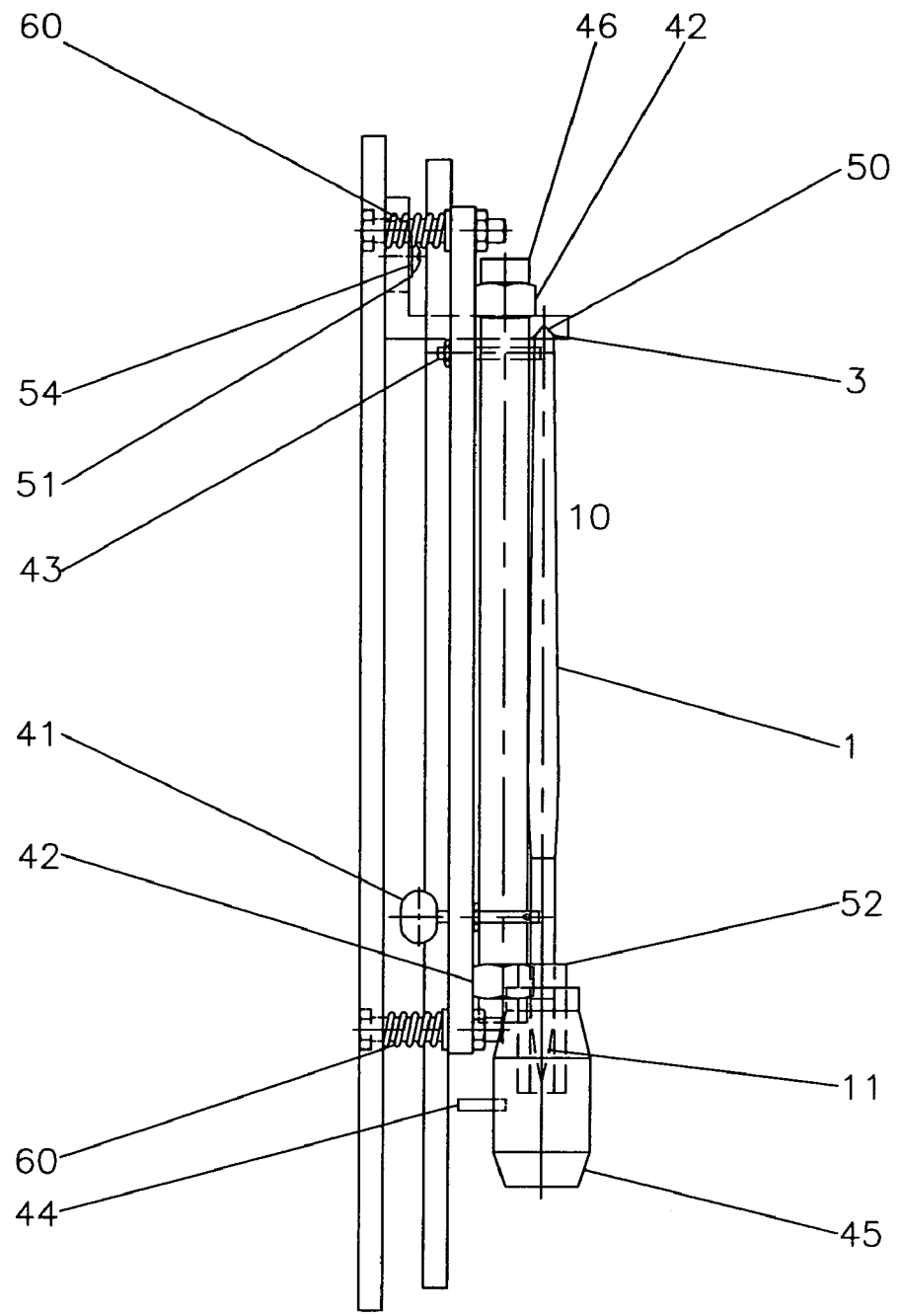
FIG. 5 depicts a side view of a handle marking device.

FIGS. 4, 5, and 6a and 6b depict an embodiment of a handle marking device 40. FIG. 4 provides an overhead view of the handle marking device 40. FIG. 5 provides a side view of the handle marking device 40. An embodiment of the handle marking device 40 may include a base 47 onto which other elements of the handle marking device 40 may be mounted. In an embodiment of the invention, an etching base 58 may be mounted to the base 47. The etching base 58 may be mounted in such a way as to be height and level adjustable in an embodiment of the invention. In other embodiments the etching base 58 may be mounted in a fixed state.

In an embodiment of the invention depicted in FIG. 3, the marks 2 may be deposited on the handle 1 by first being created on a transparent medium 30, which may be affixed to the handle 1 by adhesive means. In an alternative embodiment of the invention, the transparent medium 30 may be a heat-sensitive medium which may be placed around the handle 1 and may be affixed by applying heat to the transparent medium 30 to shrink it around the handle 1. In an alternative embodiment of the invention, the marks 2 may be drawn on the handle 1. In an alternative embodiment of the invention, the marks 2 may be etched on the handle 1. An embodiment of a handle marking device 40 which can etch the marks 2 onto the handle 1 is described below.

Figure 6:
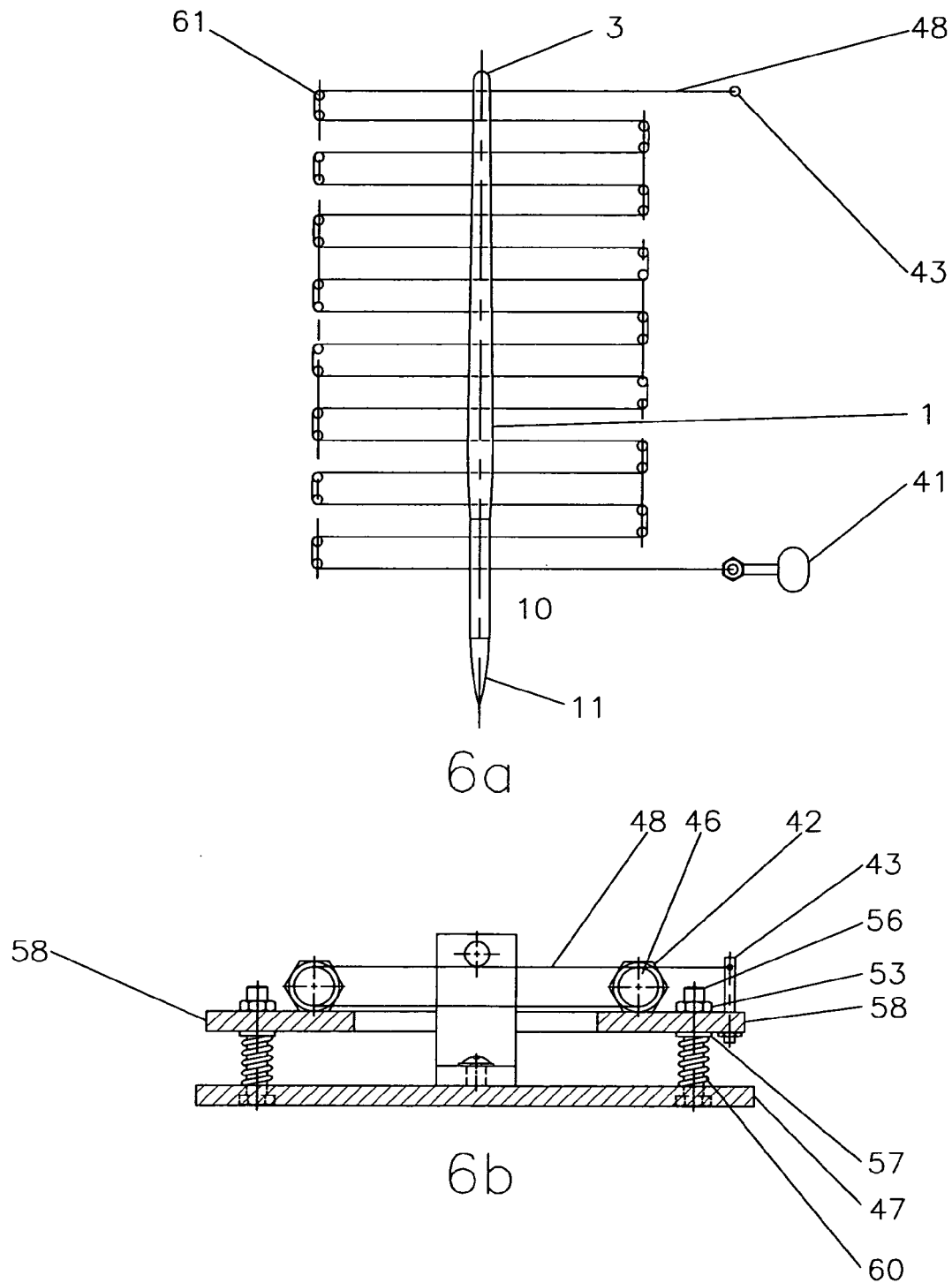
FIG. 6a illustrates an embodiment in over-head plan view.
FIG. 6b illustrates an embodiment in a side view.

FIGS. 4, 5, and 6 depict an embodiment of a handle marking device 40. FIG. 4 provides an overhead view of the handle marking device 40. FIG. 5 provides a side view of the handle marking device 40. An embodiment of the handle marking device 40 may include a base 47 onto which other elements of the handle marking device 40 may be mounted. In an embodiment of the invention, an etching base 58 may be mounted to the base 47. The etching base 58 may be mounted in such a way as to be height and level adjustable in an embodiment of the invention. In other embodiments the etching base 58 may be mounted in a fixed state.

In an embodiment of the invention the etching base 58 may be provided with elements to allow for centering of an art implement 10. A centering recess bracket 55 may be disposed on the etching base 58. A centering recess 50 may be disposed on the centering recess bracket 55. The centering recess 50 may accept the rear end 3 of an art implement 10. In an embodiment of the invention, the centering recess 50 may be adjustable by means of an adjustment slot 54. In an embodiment of the invention, a bearing may be disposed in the centering recess 50 to allow the handle 1 to rotate more easily. This adjustment allows art implements 10 of varying lengths to be accommodated. In an embodiment of the invention, the adjustment slot may be adjusted through the use of a set screw 51. In an embodiment of the invention, the art implement 10 may also be secured on its opposite end. In the embodiment shown in FIGS. 4 and 5 a brush head 11 is depicted, but in other embodiments this may be a writing point 21 or other marking end. A centering chuck 45 may be disposed on the handle marking device 40 to accept the brush head 11. In an embodiment of the invention, a stop 44 may be disposed on the handle marking device 40 near the centering chuck 45 to stop rotation of the art implement 10. In an embodiment of the invention, a protective cap 52 may also be disposed to cover the brush head 11.

In an embodiment of the invention, etching wire 48 may be provided to etch marks into the art implement handle 1. The etching wire 48 may be attached to the etching base 58 by a tension wire anchor 43. In an embodiment shown in FIG. 4, the etching wire 48 is then disposed along one or more tension wire support rods 46 in such a way as to result in an evenly spaced series of etching wires 48 passing over an art implement handle 1. The one or more tension wire support rods 46 may be disposed on the etching base 58 through the use of one or more stand-offs 42. In an embodiment of the invention shown in FIG. 6a, one or more pins 61 may be disposed at intervals on the etching base 58 and the tension wire support rods 46 may be omitted. In this embodiment the pins 61 may support the etching wire 48 in such a way as to result in an evenly spaced series of etching wires 48 passing over an art implement handle 1. In an embodiment of the invention the tension of the etching wire 48 may be adjusted using a tension adjustment 41. In an embodiment of the invention, the etching wires 48 may be covered in a dye to create the marks 2 on the art implement handle 1.

FIGS. 5 and 6b depict an embodiment of the invention wherein the etching base 58 may be attached to the base 47 in an adjustable fashion. An adjustable attachment may allow a user to adjust the etching base 58 to accommodate irregularly shaped implement handles 1. In an embodiment of the invention, one or more leveling adjustment pins 56 attach the etching base 58 to the base 47. A spring 60 and a washer 57 may be disposed on each leveling adjustment pin 56 to provide tension. The level of the etching base 58 may be adjusted through the use of one or more leveling adjustment screws 53 disposed on each of the one or more leveling adjustment pins 56.

In the embodiments previously described, an art implement handle 1 may be etched with marks 2. One non-limiting example of this operation is as follows. A user may place an art implement 10 into the handle marking device 40 as depicted in FIGS. 4 and 5, with the rear end 3 in the centering recess 50 and the brush head 11 in the centering chuck 45. Leveling adjustment pins 56 may be adjusted and the tension adjustment 41 may be adjusted to ensure contact between the etching wire 48 and the handle 1. When the centering chuck 45 is turned, the handle 1 turns and the etching wire 48 etches marks 2 into the handle 1.

Various embodiments of the present invention have been described above, but they have been presented by way of example, and not limitation. It will be apparent to persons skilled in the art that various changes may be made while remaining within the scope of the invention. Thus, the present invention should not be limited by any of the aforementioned exemplary embodiments.

The figures presented above are presented as examples only. The present invention is capable of being utilized in ways other than those shown in the figures.

The abstract of the disclosure is intended only to enable the public and the U.S. Patent and Trademark Office to determine the nature of the invention from a cursory inspection. The abstract is not intended to be limiting as to the scope of the invention.

I claim:

1. A handle marking device comprising:
    a body comprising a body longitudinal axis alignable with a longitudinal axis of a handle;
    a means for centering a rear end of the handle;
    a means for attaching a front end of the handle to a drill chuck;
    a wire assembly comprising a means for dividing an etching wire into a plurality of wire segments, wherein each of the plurality of wire segments is evenly spaced from adjacent wire segments;
    wherein the plurality of evenly spaced wire segments are adapted to apply pressure to the handle such that a plurality of lines are etched in the handle when the drill chuck is turned.

2. The handle marking device of claim 1, further comprising a means for stopping the rotation of the handle.

3. The handle marking device of claim 1, further comprising a cap for an art implement head.

* * * * *